Feb. 7, 1956  R. S. PYES  2,733,847
REAR TIRE CARRIER
Filed Sept. 22, 1952  2 Sheets-Sheet 1

RICHARD S. PYES,
INVENTOR.

HUEBNER, BEEHLER,
WORREL & HERZIG,
ATTORNEYS.
BY
Albert M Herzig

Feb. 7, 1956   R. S. PYES   2,733,847
REAR TIRE CARRIER
Filed Sept. 22, 1952   2 Sheets-Sheet 2
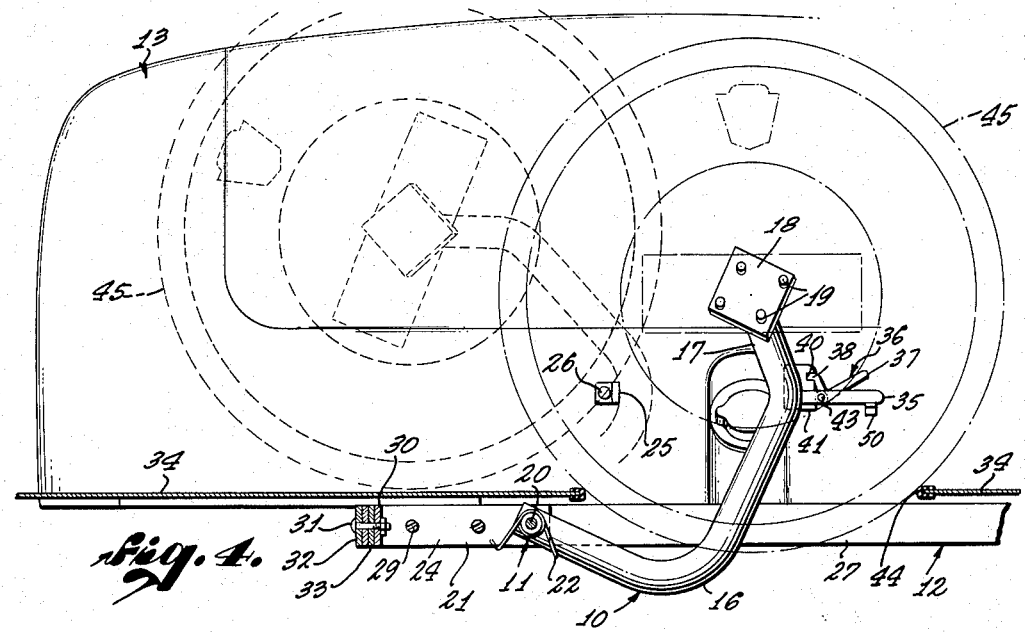
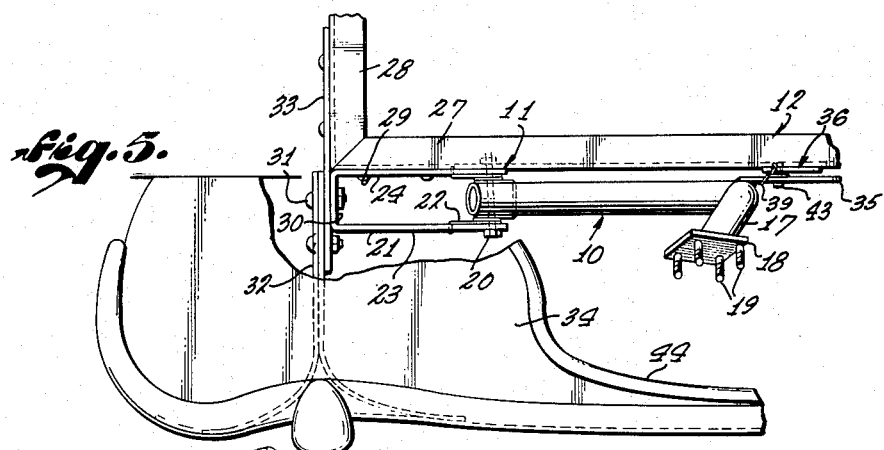
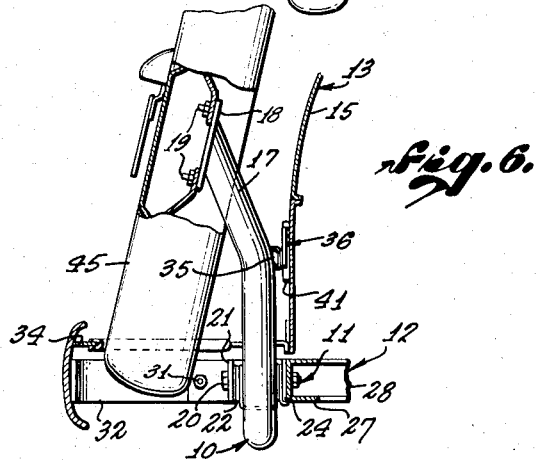
RICHARD S. PYES,
INVENTOR.
HUEBNER, BEEHLER,
WORREL & HERZIG,
ATTORNEYS.

United States Patent Office 2,733,847
Patented Feb. 7, 1956

2,733,847

REAR TIRE CARRIER

Richard S. Pyes, Los Angeles, Calif.

Application September 22, 1952, Serial No. 310,878

8 Claims. (Cl. 224—42.21)

This invention relates to spare wheel and tire carriers and more particularly to such carriers adapted to retain a spare wheel and tire in an exposed position at the rear of an automobile, especially on those automobiles having a rear trunk compartment.

It is among the objects of this invention to provide a spare wheel carrier of new and improved construction, mode of use and appearance, affording ready access to the trunk compartment or gasoline tank when desired, but normally retaining the spare wheel in an appropriate position to foster a cosmopolitan appearance and atmosphere in the vehicle.

It is also among the objects of this invention to provide such a new and improved rear mount for a spare wheel which is of a simple but theft-proof construction, neat appearance, capable of ready mass production, adaptable for easy installation on a wide variety of automobiles, providing a safe securement, and associated with a facility of use and movement of the spare wheel as desired.

Likewise among the objects of the invention is the provision of a spare wheel carrier of the desired character described embodying new and improved support means, new and improved latch and handle means, new and improved pivoting means, new and improved stop means, and new and improved features associated with the carrier for the installation thereof.

It is moreover among the objects of the invention to provide improvements over prior art devices heretofore contemplated for generally similar purposes.

With these and other objects in view, the invention consists of the construction, arrangement and combination of the various parts of the device whereby the objects contemplated are attained, as hereinafter set forth, pointed out in the appended claims, and illustrated in the accompanying drawings.

In the drawings:

Figure 4 is a rear view of the carrier and a wheel supported thereon showing the alternative positions of the carrier as used.

Figure 5 is a top view of the carrier in a latched or closed position.

Figure 6 is a side view thereof as from the right hand side of Figure 5.

Figure 1:
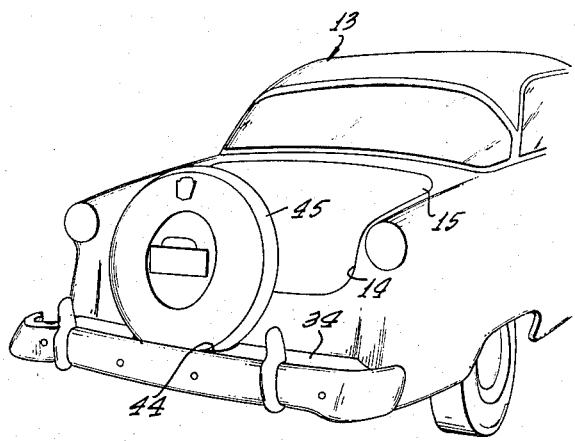
Figure 1 is a rear perspective view of an automobile fitted with a carrier embodying this invention, the carrier being in its normal closed position.
Figure 2:
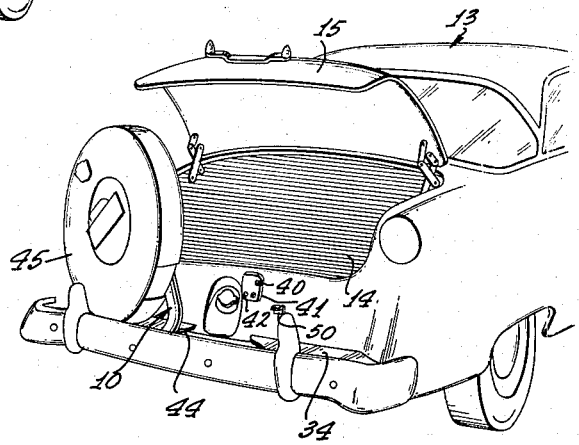
Figure 2 is a similar view showing the carrier in an open position for access to the trunk compartment.
Figure 3:
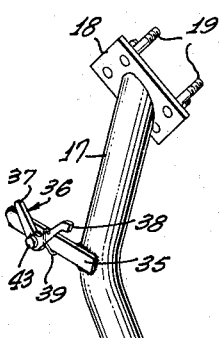
Figure 3 is a general front perspective view of a carrier embodying this invention as applied to the frame elements of an automobile.
Figure 3:
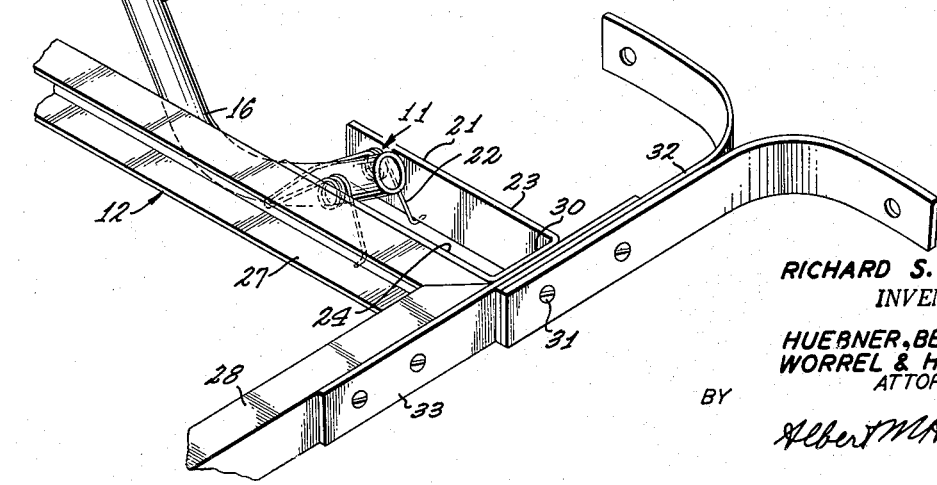

Referring more particularly to the drawing there is shown by way of illustration but not of limitation a tire carrier arm 10 pivotally mounted at 11 upon the frame 12 of an automobile 13, having a rear trunk compartment 14 equipped with a hinged cover 15.

The carrier preferably comprises the arm 10 making an angle as 90 degrees at 16, and having an offset at 17, both laterally, as shown most clearly in Figure 4, and rearwardly as shown most clearly in Figure 6.

The arm 10 is fitted at its upper end with any conventional wheel-mounting means such as a plate 18 equipped with threaded studs 19.

At its lower end the arm 10 is drilled to receive a bolt 20 by which said arm is secured to pivot within a generally C-shaped bracket 21.

A spring 22 bearing between the arm 10 and the sides 23 and 24 of the bracket normally urges the arm to open position, i. e., to the left or counterclockwise, as shown in Figure 4, said pivotal movement of the arm being preferably limited by a stop 25 secured as by a bolt 26 to the car body, preferably at a frame member therein. Any other desired stop can be provided and in any desired position on the body, the bumper, or the mounting bracket 21, even as by a bottom plate on said bracket adapted to engage the bottom of the arm itself.

The bracket 21 is also mounted on the car body, preferably at the juncture of a transverse frame member 27 and a longitudinal frame member 28, the side 24 of the bracket being in such case bolted or otherwise secured to the transverse frame as by means of bolts 29.

The closed end 30 of the bracket is also secured as by a bolt 31 passing through not only the conventional bumper supports 32, but also through special steel extension strips 33 provided for such purpose on the left side of the car to extend the rear bumper rearwardly on both sides of the car and to provide space for a gravel shield 34. The strip 33 is secured to the frame and bumper in a similar manner on both sides of the car.

In order to secure the arm 10 against opening movement while providing a handhold to permit the same to be selectively moved to open position, a handle 35 is secured as by welding to the arm preferably at the offset.

The handle 35 is associated with a latch 36 comprising a latch handle 37 and a tooth 38 normally urged by a spring 39 into a complementary notch 40 in a latch plate 41 secured as by bolts 42 to the car body preferably also at a frame member. The latch handle and tooth are urged by said spring 39 around a pintle 43 as a center.

The tooth 38 is preferably though not necessarily shaped to cam over the latch plate 41 and into latching engagement with the notch 40, and is preferably releasable therefrom only when the latch handle and handle 35 are manipulated, as squeezed, manually into a position of substantial parallelity.

The gravel shield is provided with a central opening 44 or well which accommodates the lower edge of the spare wheel and tire 45 when the carrier is in closed or locked position, as shown in Figures 1, 4 or 6. The arm 10 is similarly accommodated in a preferred forward extension in the gravel shield of the opening 44.

Of particular note is the pivot 11, which preferably is in the form of a bolt as shown. Inasmuch as it is desirable to provide maximum access for the trunk compartment and simultaneously to provide adequate clearance for raising of the trunk cover, the pivot bolt 11 is most advantageously angularly disposed relative to the front-to-rear axis of the car.

A crosshead action is thus obtained and such a structure can be advantageously substituted in some installations. For most, that shown is preferred.

Thereby, when the carrier is moved to open position, the spare wheel is moved rearwardly as well as laterally. Its plane is also tilted so that instead of leaning forward as desired for proper contouring and streamlining relative to the car body, the same is tipped almost if not actually into a position of substantial verticality from that seen in Figure 6. It may even be adjusted to tip rearwardly but that is not ordinarily required by the usual clearance requirements of the car.

In the installation of the instant carrier, the customary bumper securement bolts 31 are removed and the extensions 33 are installed to set the bumper back a sufficient distance to permit the insertion of the gravel shield and the carrier. The latter is secured by the bolts 29 and 31. The stop 25 and latch 36 are also bolted in place at predetermined positions suitably drilled in the car body for such purpose, the latch being pivotally mounted as shown upon the handle 35.

In the use of the present carrier, the spare wheel hub is bolted to the plate 18.

The wheel is preferably latched in place by the weight of the spare itself, which overcomes the latch spring and by the aforementioned camming action of the latch. Any additional stop may also be struck out as a reinforcing and wheel-supporting ear 50, which may engage the underside of the handle 35 most desirably at or adjacent its base so as to avoid interference with the use of the handle. The weight of the spare is effective for the last stated purposes of automatically keeping the latch closed and the tire in place because of the laterally offset position of the pivot 11, as seen, for example, in Figure 4.

When it is desired to open or unlock the carrier, the handles 35 and 37 are squeezed together and raised, thus disengaging the latch and raising the spare out of the well 44 in the gravel guard and over the dead-center position relative to the pivot 11. Such lifting is assisted but not entirely accomplished by the spring 22.

The operation is, of course, the same if a well or indentation is substituted in the gravel guard or if the bumper is merely divided into left and right side portions, and such are deemed equivalent structures.

Shortly after the dead-center position is passed, the spare comes to rest in a more vertical plane rearwardly and laterally of its initial position as limited by the stop 25. In such latter position, the luggage compartment becomes easily accessible, as does the gasoline tank inlet in those cars where such inlet is central of the rear end.

The offset at 17 provides both a convenient securement for the handle 35 in a place of good access, and provides a suitable positioning of the spare. The bend at 16 provides central positioning of the upright portions of the arm and convenient concealed locating for the pivot.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures and devices.

The references in this specification and the claims to left and right car sides or clockwise and counterclockwise movement are for convenience and ease of relative description and relative reference, and are not used in a limiting sense, since the referred to side of the car or the direction of rotation of the arm or its associated parts can be interchanged without affecting the nature of the invention or its mode of operation.

I claim:

1. In an automobile having a body; a support for a spare wheel comprising an arm having an upper portion adapted to engage and support a spare wheel closely adjacent said body at the rear end thereof, said arm having a lower portion located laterally of and below said upper portion, means pivotally mounting said lower portion on said automobile laterally of the fore-and-aft center line thereof for pivotal movement about a generally horizontal axis diverging forwardly from said fore-and-aft center line whereby pivotal movement of said arm about and over said axis swings said upper portion thereof and a spare wheel laterally of and rearwardly away from said body.

2. A device as defined in claim 1 wherein said arm is pivotally movable about and over said axis to swing a spare wheel from a central position to an outer position above and laterally of said axis on the outer side thereof whereby the weight of a spare wheel tends to hold said arm in either of said positions.

3. A device as defined in claim 2 including spring means biasing said arm to swing toward said outer position, said spring means not being strong enough to swing said arm from said central position with said spare wheel thereon.

4. A device as defined in claim 3 including latch means arranged to releasably hold said arm in said central position.

5. A device as defined in claim 1 wherein said arm extends generally downwardly from said upper portion to a level below said axis then upwardly and laterally to said axis.

6. A device as defined in claim 1 including stop means on said body, in the path of movement of said arm, to limit pivotal movement thereof to a sector between said central and outer positions.

7. A device as defined in claim 1 wherein said axis is defined by a pivot member extending between the ends of a C-shaped bracket, and means securing said bracket to said automobile.

8. A device as defined in claim 1 wherein said body includes a generally horizontal gravel shield at the rear thereof at a level adjacent the level of said axis, said shield having a centrally located well therein, the bottom of said spare wheel extending into said well when said arm is in said central position but being above said shield when said arm is in said outer position.

References Cited in the file of this patent

UNITED STATES PATENTS

| | | |
|---|---|---|
| 1,808,983 | Hebeler | June 9, 1931 |
| 2,593,908 | Monteverde | Apr. 22, 1952 |
| 2,620,105 | Erickson | Dec. 2, 1952 |